Aug. 20, 1968  W. SCHMIDT ETAL  3,397,910
LOCK FOR TILTABLE CAB

Filed Sept. 6, 1966  2 Sheets-Sheet 1

INVENTORS
Werner Schmidt
Hilmar Günther

BY Bailey, Stephens and Huettig
ATTORNEYS

Aug. 20, 1968   W. SCHMIDT ETAL   3,397,910
LOCK FOR TILTABLE CAB

Filed Sept. 6, 1966   2 Sheets-Sheet 2

INVENTORS
Werner Schmidt
Hilmar Günther

BY Bailey, Stephens and Huettig
ATTORNEYS 3,397,910
LOCK FOR TILTABLE CAB
Werner Schmidt and Hilmar Gunther, Munich, Germany, assignors to Maschinenfabrik Augsburg-Nurnberg Aktiengesellschaft, Munich, Germany
Filed Sept. 6, 1966, Ser. No. 577,249
Claims priority, application Germany, Sept. 9, 1965, M 66,572
1 Claim. (Cl. 296—35)

ABSTRACT OF THE DISCLOSURE

The cabin for a trailer truck has its front end swingable around a spring supported axis extending transversely of the vehicle frame, and its rear end lockable to the frame. The locking mechanism is mounted on rubber circular disc springs whose center axes extend longitudinally of the frame. The disc springs lie on an arc whose center falls on the longitudinal center line of the frame.

This invention relates to a tiltable cab for a vehicle such as a truck and in particular to a locking means for holding the driver's cab in running position.

The object of this invention is to produce a locking mechanism so that the cab is firmly locked to the vehicle frame and the lock cannot be accidently loosened or unlocked.

Another object of the invention is to produce a lock between the cab and vehicle frame which can be locked or unlocked when the vehicle is on an uneven surface and thus the frame of the vehicle axis is twisted around its longitudinal axis.

In general, these objects are accomplished by means of vertical locking pins fastened to the cab which engage a lock bar slidable in a guideway connected to the vehicle frame. In cab locked position, tongues on the lock bar engage notches in the lock pins. The lock bar is moved to unlock the cab so that it can be tilted.

The lock pins are rigidly secured to the cab while the guideway is elastically mounted on the vehicle frame so that the cab can be unlocked even with a twisted vehicle frame. The ends of the pins are conically shaped and are adapted to pass through funnel-shaped guides in order to register with the lock bar.

The means by which the objects of the invention are obtained are described more fully with reference to the accompanying drawings in which.

Figure 1:
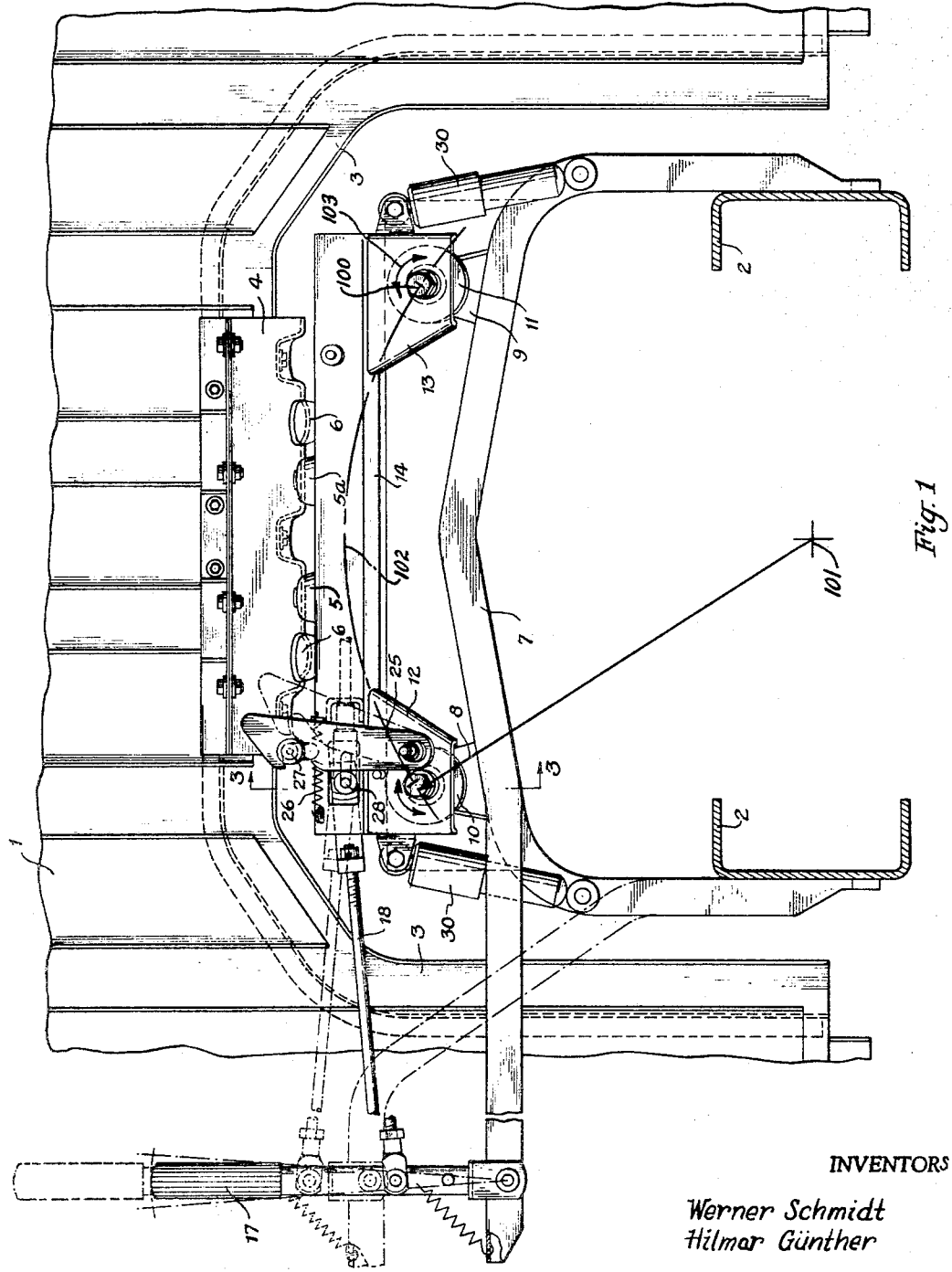
FIGURE 1 is a front view of the rear side of the cab in locked position upon the vehicle frame.
Figure 2:
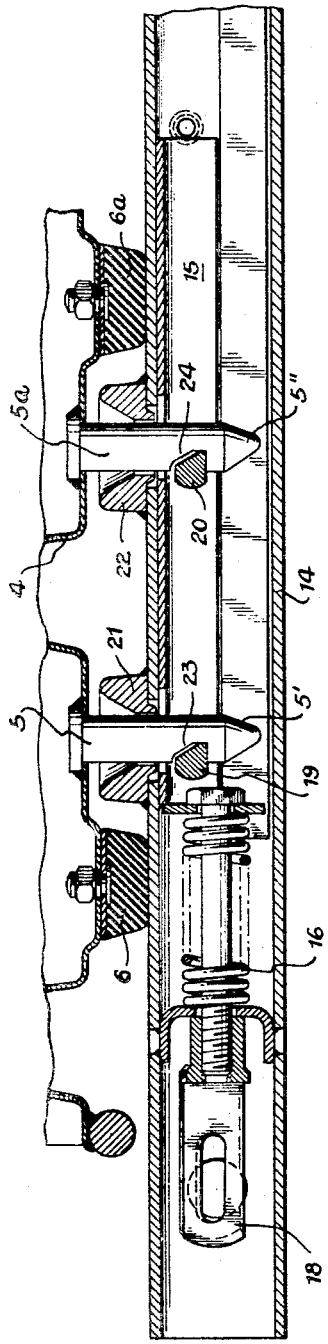
FIGURE 2 is an enlarged cross-sectional view through a portion of FIGURE 1.
Figure 3:
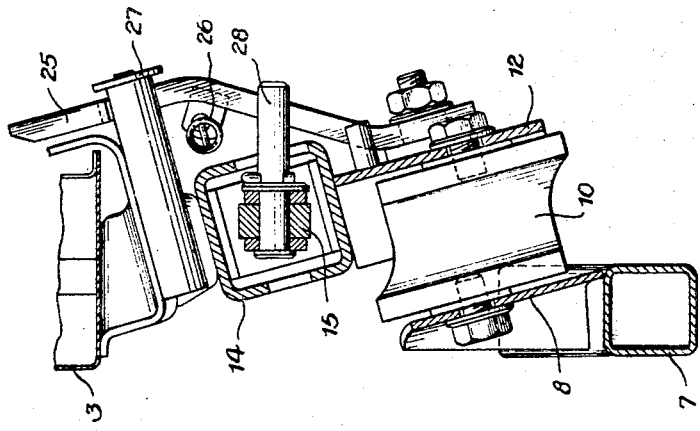
FIGURE 3 is an enlarged cross-sectional view taken on the line 3—3 of FIGURE 1.

Driver's cab 1 is tiltable about its front end on an axis extending transversely of the vehicle frame 2. Crossbeam 3 of the cab carries a seating member 4 to which vertical lock pins 5 and 5a are rigidly connected. Outwardly of pins 5 and 5a, respectively, are two resilient rubber buffers 6 and 6a which are also fastened to the seating member 4. These buffers are adapted to be slightly compressed when the cab is in its locked running position and produce a quiet noise-free operation when the cab is seated in running position.

Vehicle frame crossbeam 7 carries brackets 8 and 9 to which are attached rubber springs 10 and 11. These rubber springs are in the form of a disc so that when the vehicle frame is twisted the springs 10 and 11 become circumferentially distorted. Brackets 12 and 13 secured to the other sides of the springs 10 and 11 support a locked bar guideway 14. Lock bar 15 is slidably mounted in guideway 14 and is actuated under the influence of a spring 16 movable by a hand lever 17 and connecting rod 18. Two tongues 19 and 20 are joined to lock bar 15 and are adapted to engage pins 5 and 5a.

The registration of pins 5 and 5a with lock bar 15 is facilitated by means of funnel-shaped guides 21 and 22 mounted on the guideway 14 and also by giving the ends 5′ and 5″ of the pins a cone shape. When the cab is seated in running position with the pins 5 and 5a positioned within the guideway 14, then the tongues 19 and 20 of the lock bar 15 engage the transversely extending notches 23 and 24 in pins 5 and 5a so that the cab is locked in running position. In order to unlock the cab so that it can be tilted, the lock bar 15 is moved so that the tongues 19 and 20 are disengaged from the pins 5 and 5a. The cab can then be tilted outwardly while being supported by a stabilizer spring mechanism. Because of the funnel-shaped guides 20 and 21, the conical ends 5′ and 5″ of the pins and the springs 10 and 11, it is possible to lock and unlock and tilt the cab even when the vehicle frame is considerably twisted about its longitudinal axis relative to the cab. When the cab is in locked and running position, then its spring support with regard to the vehicle frame is not hindered within the range of the locking mechanism because of the elasticity inherent in the rubber springs 10 and 11. Twisting of the vehicle frame under the locked cab is also not hindered by the locking mechanism because the rubber springs 10 and 11 provide for the displacement of the frame without affecting the cab. The center axes 100 of disc springs 10 and 11 extend longitudinally of vehicle frame 2. The center 101 of the circumference 102 of a circle coincides with the longitudinal center axis of frame 2, and the disc centers 100 lie on this circumference. During vertical spring movements as well as twisting of the frame, the springs 10 and 11 distort in the first instance radially and in the second instance circumferentially in the direction of the arrows 103 so that they permit such movements over a large range. Twisting of the frame is especially compensated for when the rubber springs are positioned around the circumference 102 of a circle whose center lies on the twisting axis of the vehicle frame.

A hook 25 is pivotally fastened to bracket 12 as a safety measure against the unintentional or accidental unlocking of the cab. Coil spring 26 is connected between hook 25 and guideway 14. This hook is adapted to engage a pin 27 fastened to the cab and a pin 28 joined to the lock bar 15.

In operation, when the lock bar is moved to the left in FIGURE 1, the tongues 19 and 20 disengage from pins 5 and 5a and hook 25 is moved by the contraction of spring 26. The hook thus engages pin 27. Because of the vertical play between hook 25 and pin 27, the cab unlocked from pins 5 and 5a can rise only to such an extent that pins 5 and 5a move out of the range of the tongues 19 and 20. The hook is then in the position shown in full lines in FIGURE 1.

To fully unlock the cab so that it can be further tilted, the lock bar 15 is again moved slightly to the right by means of lever 17 and rod 18. Thus pin 28 is moved relative to lock bar 15 and spring 26 expands so that hook 25 is moved and released from pin 27. The cab is now fully unlocked for tilting.

Conventional shock absorbers 30 absorb the spring vibrations betwen the cab and the vehicle frame.

Having now described the means by which the objects of the invention are obtained,

We claim:

1. A locking mechanism for a driver's cab tiltably mounted on a vehicle frame having a longitudinal axis comprising guideway means, lock bar means movably mounted in said guideway means for locking the cab to said guideway means, and a plurality of rubber spring discs securing the guideway means to the vehicle frame, said discs having center axes extending in the direction of the longitudinal axis of the frame and which lie on the circumference of a circle whose center coincides with the longitudinal axis of the frame for permitting relative twisting movement of the frame.

References Cited

UNITED STATES PATENTS

| | | | | |
|---|---|---|---|---|
| 1,737,160 | 11/1929 | Johnston | | 296—35 |
| 2,168,298 | 8/1939 | Galanot. | | |
| 2,232,865 | 2/1941 | Pizzo. | | |
| 2,708,133 | 5/1955 | Sewelin et al. | | 296—35 |
| 2,740,487 | 4/1956 | Murty et al. | | 180—89 |
| 2,807,491 | 9/1957 | Deely-Jones. | | |
| 2,943,693 | 7/1960 | Norrie | | 180—89 |
| 2,951,548 | 9/1960 | Crockett et al. | | 180—89 |
| 3,184,262 | 5/1965 | Mintz | | 296—35 |
| 3,279,559 | 10/1966 | Hirst | | 180—89 |

BENJAMIN HERSH, *Primary Examiner.*

J. A. PEKAR, *Assistant Examiner.*